Nov. 1, 1949.   G. E. DATH   2,486,556
FRICTION SHOCK ABSORBING MECHANISM
Filed Feb. 5, 1945   2 Sheets-Sheet 1
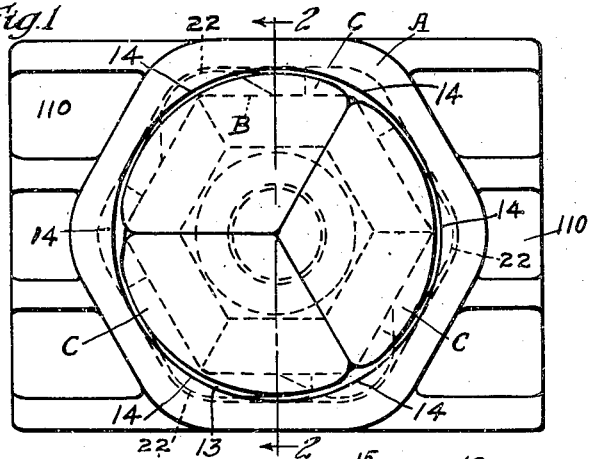
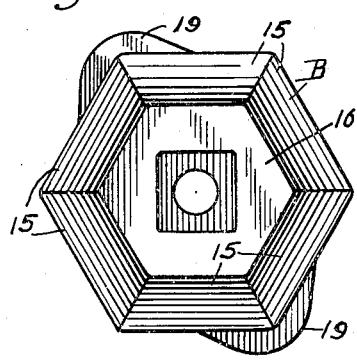
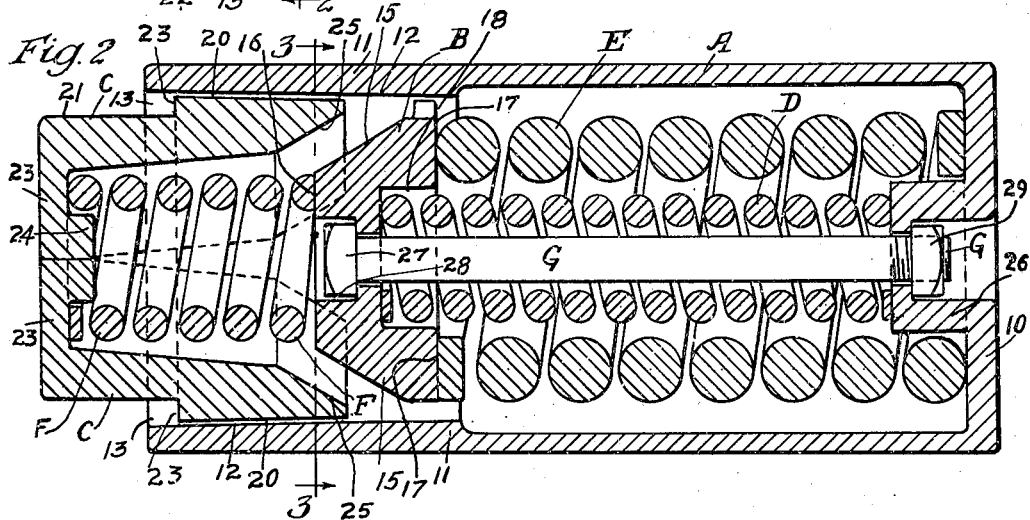
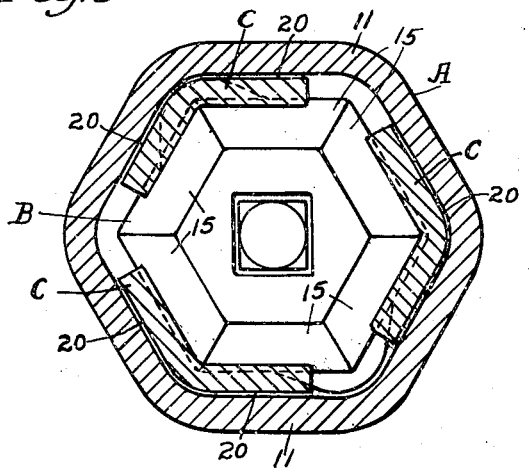
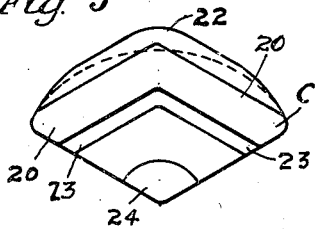
Inventor
George E. Dath
By Henry Fuchs
Atty.

Nov. 1, 1949.  G. E. DATH  2,486,556
FRICTION SHOCK ABSORBING MECHANISM
Filed Feb. 5, 1945  2 Sheets-Sheet 2
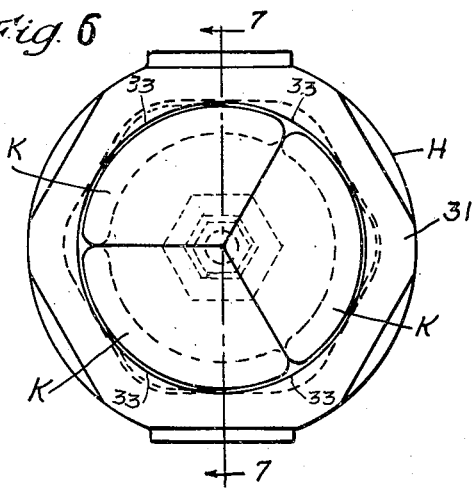
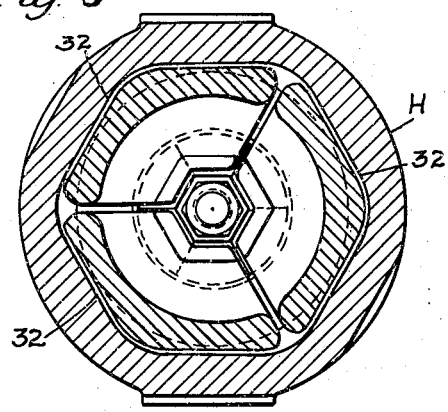
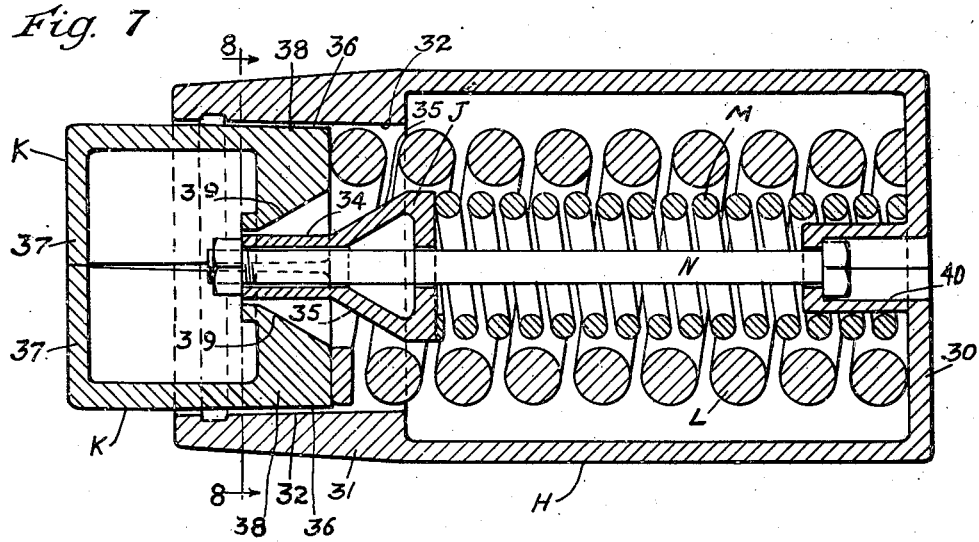
Inventor
George E. Dath
By Henry Fuchs
Atty Patented Nov. 1, 1949

2,486,556

UNITED STATES PATENT OFFICE 2,486,556

FRICTION SHOCK ABSORBING MECHANISM

George E. Dath, Mokena, Ill., assignor to W. H. Miner, Inc., Chicago, Ill., a corporation of Delaware Application February 5, 1945, Serial No. 576,166

9 Claims. (Cl. 213—34)

This invention relates to improvements in friction shock absorbing mechanisms for draft riggings of railway cars.

One object of the invention is to provide a friction shock absorbing mechanism having preliminary spring action during partial compression of the mechanism to absorb the lighter shocks to which the same is subjected, and high frictional resistance to absorb the heavier shocks wherein the high frictional resistance is produced by relatively movable friction elements which become operative after said partial compression has been effected.

A more specific object of the invention is to provide a mechanism as set forth in the preceding paragraph, wherein the relatively movable friction elements include a column and a spring resisted friction clutch slidable lengthwise on said column, the clutch including friction shoes which receive the actuating force and a combined wedge and spring follower with which the shoes have wedging engagement after predetermined partial compression of the mechanism, the friction shoes being held projected outwardly away from the combined wedge and spring follower in the normal full release position of the mechanism by spring means which provides the preliminary spring action by compression thereof while the shoes are being moved toward the combined wedge and spring follower.

Other objects of the invention will more clearly appear from the description and claims hereinafter following.

In the drawings forming a part of this specification, Figure 1 is a front elevational view of my improved friction shock absorbing mechanism. Figure 2 is a longitudinal, vertical sectional view, corresponding substantially to the line 2—2 of Figure 1. Figure 3 is a transverse, vertical sectional view, corresponding substantially to the line 3—3 of Figure 2. Figure 4 is a front elevational view of the wedge employed in my improved mechanism. Figure 5 is a rear elevational view of one of the friction shoes employed in my improved mechanism. Figure 6 is a view, similar to Figure 1, illustrating another embodiment of the invention. Figure 7 is a longitudinal, vertical sectional view, corresponding substantially to the line 7—7 of Figure 6. Figure 8 is a transverse, vertical sectional view, corresponding substantially to the line 8—8 of Figure 7.

Referring first to the embodiment of the invention illustrated in Figures 1 to 5 inclusive, my improved friction shock absorbing mechanism comprises broadly a friction casing A; a wedge block B; three friction shoes C—C—C; a main spring resistance comprising inner and outer coil springs D and E; a preliminary spring F; and a retainer bolt G.

The casing A is in the form of a tubular member of hexagonal, transverse cross section, open at its front end and closed at its rear end by a transverse, vertical wall 10. The wall 10 is extended laterally outwardly of the casing A at opposite sides thereof, thereby providing flanges 110—110 which form a rear follower member integral with the casing. At the forward end, the walls of the casing are thickened, thereby providing the friction shell section proper 11, which is of hexagonal, interior cross section. The interior walls of the friction shell section present three interior friction surfaces 12—12—12 which converge rearwardly of the mechanism and are of V-shaped, transverse cross section, each surface being formed by two adjacent walls of the shell. The opening at the front end of the casing, which opening is indicated by 13, is of true circular formation and the inner faces of the walls of the friction shell section of the casing, considered in transverse direction, are tangent to the circle defining said opening. Inturned flanges 14—14—14 at the forward or open end of the casing define the circular opening 13, having their inner edge faces curved, each flange extending from the mid portion of one face to the mid portion of the other face of each V-shaped friction surface 12. These flanges 14—14—14 form stop shoulders at alternate corners of the casing, that is, a stop shoulder at the apex of each V-shaped friction surface. The stop shoulders formed by the flanges 14—14—14 serve to limit movement of the friction shoes C—C—C outwardly of the casing A.

The wedge B comprises a block in the form of a truncated pyramid of hexagonal shape, presenting three forwardly converging wedge faces 15—15—15 of V-shaped, transverse cross section, each V-shaped wedge face being formed by two adjacent sides of the hexagonal block. The block B has a transverse, flat, front end face 16 on which the rear end of the preliminary spring F bears, and a transverse, flat, rear end face 17 on which the front end of the spring E bears. A rearwardly opening central pocket 18 is provided in the block B, forming a seat for the front end of the spring D.

To prevent rotation of the block B within the casing A, the former is provided with two diametrically opposite, radial wings or lugs 19—19 which engage within diametrically opposite corners of the hexagonal casing A.

The friction shoes C, which are three in number, are of like design and arranged symmetrically about the longitudinal central axis of the mechanism. Each shoe C is of generally V-shaped, transverse cross section and has a longitudinally extending friction surface 20 of V-shaped, transverse cross section on its outer side at the rear end portion thereof, slidably engaging the corresponding V-shaped friction surface 12 of the casing. Forwardly of the friction surface 20, the outer side of each shoe is inwardly offset, as indicated at 21, the surface of said offset portion being transversely curved, thereby providing the offset section 21 with a rounded outer side. The curved surfaces of the sections 21—21—21 of the three shoes are of the same radius and lie in a circle which is concentric with the circular opening 13 of the casing, but of slightly smaller diameter. The reduced front end portions of the shoes C—C—C are thus freely movable inwardly and outwardly of the casing and guided in the opening 13. The offset sections 21 of the shoes provide transverse abutment shoulders 22—22—22 at the front ends of the friction surfaces adapted to engage in back of the flanges 14 of the casing A to limit outward movement of the shoes. At the forward end, each shoe is provided with an inturned flange 23 having laterally inwardly converging side edges which are radial to the longitudinal central axis of the mechanism. The flanges 23 of the three shoes are in abutment with each other along their radial side edges, the assembled shoes thus forming, in effect, a three piece cap divided on radial lines and having a flat front end wall which is formed by the three flanges of the shoes. An inwardly projecting, central, spring centering boss 24 for the spring F is provided on the shoes C—C—C, the boss being formed partly on each shoe. At the extreme rear end thereof, each shoe C has a wedge face 25 of V-shaped, transverse section on the inner side thereof, which is correspondingly inclined to and adapted to be engaged by the V-shaped wedge face 15 at the corresponding side of the wedge block B.

As shown most clearly in Figure 2, the shoes C—C—C are cut away at an inclination along their inner side edges, that is, the opposed inner edges of adjacent shoes diverge rearwardly of the mechanism, thereby providing a certain amount of clearance between the shoes at the rear end portions thereof to permit contracting the assembled unit of three shoes to allow insertion of the same within the friction casing through the open front end of the latter, as hereinafter described.

The main spring resistance comprising the coil springs D and E is disposed within the casing A, being interposed between the rear end of the wedge B and the transverse end wall 10 of the casing, the spring E surrounding the spring D. The spring D is lighter and of less capacity than the spring E and has its front end engaged within the pocket 18 of the block B. The rear end of the spring D bears on an inwardly projecting, hollow boss 26 on the wall 10 of the casing. The spring E has its front and rear ends bearing respectively on the flat rear end face 17 of the wedge block B and the end wall 10 of the casing.

The retainer bolt G extends through the inner coil D of the main spring resistance and has a head 27 at its front end seated in a pocket 28 in the wedge block B. At the rear end of the bolt G, a nut 29 is provided, which is disposed within the hollow boss 26 and has shouldered engagement therewith to anchor the bolt to said boss. The bolt G limits outward movement of the wedge block B, holding the same spaced inwardly from the shoes, in the normal full release position of the mechanism, and is preferably so adjusted that the springs D and E are under initial compression.

The preliminary spring F, which is relatively short, is embraced between the shoes C—C—C and has its front and rear ends bearing respectively on the flanges 23 of the shoes and the flat front end face 16 of the wedge block.

In assembling the mechanism, the spring F and the shoes C—C—C are applied to the casing after the springs D and E and the wedge block B have been assembled therewith and the wedge block anchored by the bolt G. In applying the spring F and the shoes C—C—C, the spring is first placed on top of the wedge block B while the casing is supported in vertical position. The shoes are then successively inserted within the casing A and the shoulders 22 thereof engaged in back of the flanges 14—14—14 of the casing, the clearance provided between the shoes at the rear end portions thereof permitting the necessary tilting to clear the flanges as the shoes are inserted.

The operation of my improved friction shock absorbing mechanism, as shown in Figures 1 to 5 inclusive, is as follows: Upon compression of the mechanism in the usual manner, the shoes C—C—C are forced inwardly of the casing against the resistance of the spring F, the latter being compressed against the wedge block B which is held substantially stationary during the first part of the compression stroke due to the high capacity of the main spring resistance comprising the springs D and E. During compression of the spring F, there is substantially no frictional resistance produced between the friction shoes and the friction surfaces of the casing A as the wedge faces of the shoes are not in contact with the wedge faces of the wedge block B at this time. A light preliminary spring action is thus provided to absorb the lighter shocks. As the shoes move inwardly of the casing during full compression of the mechanism, the wedge faces of the shoes come into engagement with the wedge faces of the block B, forcing the block B inwardly against the resistance of the main spring and wedging the shoes apart into tight frictional engagement with the friction surfaces of the casing. High frictional resistance is thus provided during the remainder of the compression stroke. When the actuating force is reduced, the main spring resistance comprising the springs D and E returns the wedge block B to the normal full release position shown in Figure 2 and the spring F returns the shoes to their full release position, the latter being limited in their outward movement by shouldered engagement with the stop flanges 14—14—14 of the casing. As shown in Figure 2, in the normal position of the parts, the wedge faces of the shoes and wedge block are spaced an appreciable distance apart, the retainer bolt G restricting outward movement of the wedge to produce this result.

Referring next to the embodiment of the invention illustrated in Figures 6, 7, and 8, my improved friction shock absorbing mechanism comprises a friction casing H; a wedge block J; three friction shoes K—K—K; springs L and M; and a retainer bolt N.

The casing H is in the form of a hollow, tubular member having a vertical transverse rear end wall 30 and is open at the front end. The front end portion of the casing H, which is indicated by 31, forms the friction shell section thereof and is of hexagonal, interior, transverse cross section. The spring cage section of the casing, which is rearwardly of the friction shell 31, is preferably of cylindrical, transverse cross section. The friction shell section 31 presents three longitudinally extending, interior friction surfaces 32—32—32 of V-shaped, transverse cross section, which converge inwardly of the casing. At the open end thereof, forwardly of the friction surfaces 32, the casing has a plurality of inturned flanges 33—33—33 similar to the flanges 14—14—14 hereinbefore described in connection with the disclosure in Figures 1 to 5 inclusive, and operating in a similar manner.

The wedge J is in the form of a hollow block having a reduced front end portion 34 in the form of a tubular sleeve integral therewith. The main body portion of the wedge J is provided with three wedge faces 35—35—35 arranged symmetrically about the longitudinal central axis of the block. The wedge faces 35 are of V-shaped, transverse cross section and the three wedge faces converge forwardly of the mechanism.

The friction shoes K are three in number and have friction surfaces 36 on the outer sides thereof which extend lengthwise of the mechanism and are of V-shaped, transverse cross section. The V-shaped friction surface 36 of each shoe slidingly engages the corresponding V-shaped friction surface 32 of the friction shell 31 of the casing H. The shoes K are provided with inturned flanges 37 at the forward ends thereof corresponding to the flanges 23 of the shoes C hereinbefore described in connection with Figures 1 to 5 inclusive. At the rear ends, the shoes are provided with laterally inwardly extending, relatively heavy flanges 38—38—38, which present V-shaped wedge faces 39 on the inner sides thereof adapted to be engaged by the wedge faces 35 of the block J and correspondingly inclined thereto. The rear end portions of the shoes are cut away at opposite sides to provide clearance to permit tilting of the shoes in a manner similar to the shoes C—C—C to facilitate the assembling operation, as hereinbefore described in connection with Figures 1 to 5 inclusive. Forwardly of the V-shaped friction surface 36, each shoe K has a shoulder similar to the shoulder 22 of the shoe C hereinbefore described, which engages the flange 33 of the casing H to limit outward movement of the shoe.

The spring L is in the form of a relatively heavy, helical coil which surrounds the spring M and bears at its front and rear ends on the inner ends of the shoes K—K—K and the transverse end wall 30 of the casing, respectively.

The spring M, which is in the form of a relatively light inner coil, bears on the rear end of the wedge J and the wall 30 of the casing and is centered by an inwardly projecting, hollow boss 40 extending from the wall 30.

The wedge block J is anchored to the casing by the retainer bolt N, having a head at its rear end shouldered within the hollow boss 40, and a nut at its front end in shouldered engagement with the wedge block J. The bolt N holds the wedge block in position with the wedge faces 35 thereof spaced rearwardly from the wedge faces 39 of the shoes, as most clearly illustrated in Figure 7, which shows the normal position of the parts.

The operation of the improved mechanism shown in Figures 6, 7, and 8 is as follows: During compression of the mechanism, the shoes K—K—K are forced inwardly of the casing H against the resistance of the heavy coil spring L, thereby providing preliminary spring action, there being substantially no frictional resistance between the shoes and the casing during the first part of the compression stroke. This takes care of the lighter shocks encountered in service. Upon further compression of the mechanism, the wedge faces of the friction shoes K—K—K engage the wedge faces of the block J forcing the latter rearwardly against the resistance of the inner spring M. During this action, the shoes K—K—K are wedged apart by the wedge J into tight frictional contact with the friction surfaces of the casing as the shoes slide rearwardly of the casing, thereby providing high frictional resistance during the last part of the compression stroke to absorb heavier shocks. As will be evident, during this action, the heavy coil spring L is also compressed, thus adding to the capacity of the device. When the actuating force is reduced, the springs L and M return all of the parts to the normal full release position shown in Figure 7, outward movement of the shoes being limited by shouldered engagement with the flanges 33 of the casing H, and outward movement of the wedge being limited by the retainer bolt N.

I claim:

1. In a friction shock absorbing mechanism, the combination with a friction casing having lengthwise extending, interior friction surfaces; of friction shoes telescoped within the casing in lengthwise sliding engagement with said friction surfaces, said shoes normally projecting outwardly beyond the end of the casing to receive the actuating force; a combined wedge and spring follower member, said member and shoes having wedge faces engageable with each other after said mechanism has been partially compressed; spring means yieldingly opposing movement of said shoes inwardly of the casing; a second spring means yieldingly opposing movement of said combined wedge and spring follower member inwardly of the casing; means for arresting outward movement of said shoes; and means for arresting outward movement of said combined wedge and spring follower member in position with the wedge faces thereof in inwardly spaced relation with respect to the wedge faces of the shoes to permit inward movement of said shoes with respect to the combined wedge and spring follower during said partial compression of the mechanism.

2. In a friction shock absorbing mechanism, the combination with a friction casing having interior friction surfaces extending lengthwise thereof; of friction shoes telescoped within the casing in lengthwise sliding engagment with said friction surfaces, said shoes normally projecting outwardly beyond the end of the casing to receive the actuating force; a combined wedge and spring follower member within said casing, said member and shoes having wedge faces engageable with each other after said mechanism has been partially compressed; a spring buttressed at its front and rear ends respectively against said shoes and casing to yieldingly oppose movement of said shoes inwardly of the casing; a second spring buttressed at its front and rear ends respectively against said member and casing to yieldingly oppose movement of said member inwardly of the casing; means for arresting outward movement of said shoes; and means for arresting outward movement of said member in position with the wedge faces thereof in inwardly spaced relation with the wedge faces of said shoes to permit inward movement of said shoes with respect to said member during partial compression of the mechanism.

3. In a friction shock absorbing mechanism, the combination with a friction casing having interior friction surfaces extending lengthwise thereof; of friction shoes telescoped within the casing in lengthwise sliding engagement with said friction surfaces, said shoes normally projecting outwardly beyond the end of the casing to receive the actuating force; a combined wedge and spring follower member within said casing, said member and shoes having wedge faces engageable with each other after said mechanism has been partially compressed; a spring interposed between said shoes and member and bearing at its front and rear ends respectively against said shoes and member to yieldingly oppose movement of said shoes inwardly of the casing; a second spring buttressed at its front and rear ends respectively against said member and casing to yieldingly oppose movement of said member inwardly of the casing; means for arresting outward movement of said shoes; and means for arresting outward movement of said member in position with the wedge faces thereof in inwardly spaced relation with the wedge faces of said shoes to permit inward movement of said shoes with respect to said member during partial compression of the mechanism.

4. In a friction shock absorbing mechanism, the combination with a friction casing open at its front end and closed at the rear end, said casing having inturned stop flanges at its open end and lengthwise extending, interior friction surfaces at said open end inwardly of said stop flanges; of friction shoes telescoped within the casing in lengthwise sliding engagement with said friction surfaces, said shoes having shouldered engagement with said stop flanges to arrest outward movement of said shoes with the outer ends of the shoes projecting from the casing to receive the actuating force; a combined wedge and spring follower member rearwardly of the shoes, said member and shoes having wedge faces engageable with each other after said mechanism has been partially compressed; a spring yieldingly opposing movement of said shoes inwardly of the casing; a second spring yieldingly opposing movement of said member inwardly of the casing; and a retainer bolt anchored at its opposite ends to said member and casing for arresting outward movement of said member in position with the wedge faces thereof in inwardly spaced relation with respect to the wedge faces of said shoes to permit inward movement of said shoes with respect to said member during said partial compression of the mechanism.

5. In a friction shock absorbing mechanism, the combination with a friction casing open at its front end and closed at the rear end, said casing having inturned stop flanges at its open end and lengthwise extending, interior friction surfaces at said open end inwardly of said stop flanges; of friction shoes telescoped within the casing in lengthwise sliding engagement with said friction surfaces, said shoes having shouldered engagement with said stop flanges to arrest outward movement of said shoes with the outer ends of the shoes projecting from the casing to receive the actuating force; a combined wedge and spring follower member within said casing rearwardly of the shoes, said member and shoes having wedge faces engageable with each other after said mechanism has been partially compressed; a spring buttressed at its front and rear ends respectively against said shoes and closed end of the casing yieldingly opposing movement of said shoes inwardly of the casing; a second spring buttressed at its front and rear ends respectively against said member and closed end of the casing yieldingly opposing movement of said member inwardly of the casing; and a retainer bolt anchored at its opposite ends to said member and casing for arresting outward movement of said member in position with the wedge faces thereof in inwardly spaced relation with respect to the wedge faces of said shoes to permit inward movement of said shoes with respect to said member during said partial compression of the mechanism.

6. In a friction shock absorbing mechanism, the combination with a friction casing open at its front end and closed at the rear end, said casing having inturned stop flanges at its open end and lengthwise extending, interior friction surfaces at said open end inwardly of said stop flanges; of friction shoes telescoped within the casing in lengthwise sliding engagement with said friction surfaces, said shoes having shouldered engagement with said stop flanges to arrest outward movement of said shoes with the outer ends of said shoes projecting from the casing to receive the actuating force; a combined wedge and spring follower member within said casing rearwardly of the shoes, said member and shoes having wedge faces engageable with each other after said mechanism has been partially compressed; a spring interposed between said shoes and member and bearing at its front and rear ends respectively against said shoes and said member, and yieldingly opposing movement of said shoes inwardly of the casing; a second spring buttressed at its front and rear ends respectively against said member and closed end of the casing and yieldingly opposing movement of said member inwardly of the casing; and a retainer bolt anchored at its opposite ends to said member and casing for arresting outward movement of said member in position with the wedge faces thereof in inwardly spaced relation with respect to the wedge faces of said shoes to permit inward movement of said shoes with respect to said member during said partial compression of the mechanism.

7. In a friction shock absorbing mechanism, the combination with a column element having lengthwise extending friction surfaces; of friction shoes in lengthwise sliding engagement with said friction surfaces, said shoes normally projecting outwardly beyond the end of said column element to receive the actuating force; a combined wedge and spring follower member, said member and shoes having wedge faces engageable with each other after said mechanism has been partially compressed; spring means yieldingly opposing movement of said shoes inwardly of said element; a second spring means yieldingly opposing movement of said combined wedge and spring follower member inwardly of said element; means for arresting outward movement of said shoes; and means for arresting outward movement of said combined wedge and spring follower member in position with the wedge faces thereof in inwardly spaced relation with respect to the wedge faces of the shoes to permit inward movement of said shoes with respect to the combined wedge and spring follower during said partial compression of the mechanism.

8. In a friction shock absorbing mechanism, the combination with a column element having interior friction surfaces extending lengthwise thereof; of friction shoes in lengthwise sliding engagement with said friction surfaces, said shoes receiving the actuating force; a combined wedge and spring follower member rearwardly of said shoes, said member and shoes having wedge faces engageable with each other after said mechanism has been partially compressed; a spring buttressed at its front and rear ends respectively against said shoes and column element to yieldingly oppose movement of said shoes inwardly of said element; a second spring buttressed at its front and rear ends respectively against said member and column element to yieldingly oppose movement of said member inwardly of said element; means for arresting outward movement of said shoes, with the outer ends thereof projecting outwardly of said element to receive the actuating force; and means for arresting outward movement of said member in position with the wedge faces thereof in inwardly spaced relation with respect to the wedge faces of said shoes to permit inward movement of said shoes with respect to said member during partial compression of the mechanism.

9. In a friction shock absorbing mechanism, the combination with a column element having friction surfaces extending lengthwise thereof; of friction shoes in lengthwise sliding engagement with said friction surfaces; a combined wedge and spring follower member rearwardly of said shoes, said member and shoes having wedge faces engageable with each other after said mechanism has been partially compressed; a spring interposed between said shoes and member and bearing at its front and rear ends respectively against said shoes and member to yieldingly oppose movement of said shoes inwardly of said element; a second spring buttressed at its front and rear ends respectively against said member and said element to yieldingly oppose movement of said member inwardly of said element; means for arresting outward movement of said shoes with the outer ends thereof projecting beyond the outer end of said element to receive the actuating force; and means for arresting outward movement of said member in position with the wedge faces thereof in inwardly spaced relation with the wedge faces of said shoes to permit inward movement of said shoes with respect to said member during partial compression of the mechanism.

GEORGE E. DATH.

REFERENCES CITED

The following references are of record in the file of this patent:

UNITED STATES PATENTS

| Number | Name | Date |
| --- | --- | --- |
| 1,175,580 | Anderson | Mar. 14, 1916 |
| 2,329,338 | Dath | Sept. 14, 1943 |